(12) United States Patent
Wang et al.

(10) Patent No.: US 11,395,361 B2
(45) Date of Patent: Jul. 19, 2022

(54) METHOD FOR PROCESSING RLC FAILURE, NETWORK DEVICE AND COMPUTER STORAGE MEDIUM

(71) Applicant: Samsung Electronics Co., Ltd, Suwon-si (KR)

(72) Inventors: Weiwei Wang, Beijing (CN); Hong Wang, Beijing (CN); Lixiang Xu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/449,213

(22) Filed: Jun. 21, 2019

(65) Prior Publication Data

US 2019/0394826 A1     Dec. 26, 2019

(30) Foreign Application Priority Data

Jun. 21, 2018   (CN) .......................... 201810646390.8

(51) Int. Cl.
*H04L 45/28*    (2022.01)
*H04W 76/19*   (2018.01)
*H04W 88/08*   (2009.01)

(52) U.S. Cl.
CPC .......... *H04W 76/19* (2018.02); *H04W 88/085* (2013.01)

(58) Field of Classification Search
None
See application file for complete search history.

(56) References Cited

U.S. PATENT DOCUMENTS 8,411,652 B2 *   4/2013   Hans ...................... H04L 29/06
                                                                370/338
10,470,233 B2 *  11/2019  Bergquist .............. H04W 76/19
(Continued)

FOREIGN PATENT DOCUMENTS

EP          3820238 A1      5/2021

OTHER PUBLICATIONS

ISA/KR, International Search Report and Written Opinion of the International Searching Authority, International Application No. PCT/KR2019/007506, dated Oct. 2, 2019, 11 pages.
(Continued)

*Primary Examiner* — Willie J Daniel, Jr.

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present application relates to the field of wireless communication technologies, and discloses a method for processing an RLC failure, an electronic device and a computer readable storage medium. The method for processing a Radio Link Control (RLC) failure includes: receiving, by a first network device, RLC failure related information of a user equipment (UE); processing the RLC failure correspondingly by interacting with a second network device, based on the received RLC failure related information. The method of the embodiments in the present application, enables the first network device to interact with the second network device directly, so as to directly determine RLC failure processing according to the received RLC
(Continued)

failure related information and the interaction information reported by the UE, thereby simplifying RLC processing, improving processing efficiency, facilitating to resolve the RLC failure correctly and rapidly, and improving user experience.

8 Claims, 12 Drawing Sheets

(56) References Cited

U.S. PATENT DOCUMENTS

| | | |
|---|---|---|
| 2015/0223282 A1 | 8/2015 | Vajapeyam et al. |
| 2021/0068186 A1* | 3/2021 | Wu .................. H04W 76/19 |
| 2021/0168758 A1 | 6/2021 | Luo et al. |

OTHER PUBLICATIONS

Ericsson, "RLC failure for PDCP duplication," R2-1807215 (Revision of R2-1805132), 3GPP TSG-RAN WG2 #102, Busan, Korea, May 21-25, 2018, 5 pages.

Samsung, "RLF and Its Recovery Procedures in NR," R2-1705592 (Resubmission), 3GPP TSG RAN WG2 #98, Hangzhou, China, May 15-19, 2017, 5 pages.

Samsung, "RLC Failure Information," Change Request, R2-1809123, 3GPP TSG-RAN WG2 Meeting #102, Busan, Korea, May 21-25, 2018, 6 pages.

VIVO, "L2 impacts on RLC failure," R2-1807587, 3GPP TSG-RAN WG2 Meeting #102, Busan, Korea, May 21-25, 2018, 2 pages.

European Patent Office, "Supplementary European Search Report," dated Mar. 3, 2022, in connection with European Patent Application No. 19823528.5, 9 pages.

Samsung, "(TP for NR BL CR for TS38.473) Discussions on RLC-Failure", 3GPP TSG-RAN WG3 Meeting #101 R3-184846, Gothenburg, Sweden, Aug. 20-24, 2018, 9 pages.

3GPP TS 38.473 V15.1.1 (Apr. 2018) Technical Specification; 3rd Generation Partnership Project; Technical Specification Group Radio Access Network; NG-RAN; F1 application protocol (F1AP) (Release 15); 106 pages.

3GPP TS 36.331 V15.2.0 (Jun. 2018) Technical Specification; 3rd Generation Partnership Project; Technical Specification Group Radio Access Network; Evolved Universal Terrestrial Radio Access (E-UTRA); Radio Resource Control (RRC); Protocol specification; (Release 15); 791 pages.

* cited by examiner

METHOD FOR PROCESSING RLC FAILURE, NETWORK DEVICE AND COMPUTER STORAGE MEDIUM

CROSS-REFERENCE TO RELATED APPLICATION

This application is based on and claims priority under 35 U.S.C. 119 to Chinese Patent Application No. 201810646390.8 filed on Jun. 21, 2018 in the Chinese Intellectual Property Office, the disclosure of which is herein incorporated by reference in its entirety.

BACKGROUND

1. Field

The present application relates to the field of wireless communication technologies, and in particular, to a method for processing an RLC failure, an electronic device, and a computer storage medium.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In the New Radio Access (NR) network or the fifth-generation (5G) network, in order to ensure the reliability of data transmission, a CA-based duplication mechanism (i.e., a carrier aggregation-based packet data duplication mechanism) is defined as shown in FIG. 1. Wherein a Packet Data Convergence Protocol (PDCP) layer copies the generated PDCP Protocol Data Unit (PDU) into two copies, transmits them to two different Radio link control (RLC) entities (e.g., RLC1 and RLC2), then transmits them to Medium Access Control (MAC) layers via different logical channels (e.g., logical channel 1 and logical channel 2). Data from different logical channels is required to be transmitted via different cells. For example, data from logical channel 1 is required to be transmitted via at least one cell (e.g., cell 1-1, cell 1-2, . . . ), data from logical channel 2 is required to be transmitted via at least one cell (e.g., cell 2-1, cell 2-2, . . . ), and cells serving the logical channel 1 are different from cells serving logical channel 2. In the CA-based duplication mechanism, the user served by the mechanism may be configured with two paths. One path corresponds to RLC1, logical channel 1, and the cells corresponding to the logical channel, and the other path corresponds to RLC2, logical channel 2, and the cells corresponding to the logical channel. In FIG. 1, if for uplink, a transmitting side is a UE, and a receiving side is a base station; if for downlink, the transmitting side is the base station, and the receiving side is the UE.

Recent studies have shown that for a user configured with CA duplication, if cells corresponding to (or "associated with") the user's logical channels are all SCells (Secondary Cell, that is a cell that not including a primary cell (PCell) or a primary SCell (PSCell), wherein the definitions of PCell, PSCell, and SCell may be referred to Protocol TS38.331 or TS36.331), when the RLC entity corresponding to the logical channel fails (the number of retransmissions reaches or exceeds the maximum number of retransmissions), the user side (i.e., the user equipment (UE)) are not required to start a re-establishing process of Radio Resource Control (RRC), which the UE may provide related information (i.e., RLC failure related information) to the network side (i.e., the device at network side, which may be abbreviated as a network device), and the network side determines this failure processing. When the UE reports the information to the network side, an identifier of the logical channel corresponding to the failed RLC entity may be included, and a cell group (for example, Master Cell Group (MCG), Secondary Cell Group (SCG), etc.) in which the SCell corresponding to the failed RLC entity is located may also be included.

Although the network side may process the RLC failure according to the RLC failure related information reported by the UE, the processing procedure is cumbersome and inefficient, which is not conducive to correctly and quickly solving the RLC failure, and greatly reduces the user experience.

SUMMARY

The present application aims to solve at least one of above technical defects, in particular, technical defect of the cumbersome and inefficient processing procedure.

In a first aspect, a method for processing an RLC failure is provided, comprising:

receiving Radio link control (RLC) failure related information of a user equipment (UE);

processing the RLC failure correspondingly based on the received RLC failure related information.

In a second aspect, a method for processing an RLC failure is provided, comprising:

receiving, by a second network device, a second request message transmitted by a first network device and including RLC failure related information from a UE;

processing the RLC failure correspondingly, based on the received second request message.

In a third aspect, a network device is provided, which comprises a memory, a processor, and a computer program stored on the memory and operable on the processor, the methods for processing an RLC failure described above being implemented when the processor executes the program.

In a fourth aspect, a computer readable storage medium is provided, which stores a computer program that, when executed by a processor, implements the methods for processing an RLC failure described above.

In the methods for processing an RLC failure provided by the embodiments of the present application, the first network device receives the RLC failure related information of the UE, and provides a premise guarantee for the subsequent network device to process the RLC failure correspondingly; a corresponding processing of the RLC failure is performed by interacting with the second network device based on the received RLC failure related information such that the first network device is able to directly interact with the second network device, so as to directly determine the processing of the RLC failure according to the received RLC failure related information and the interaction information reported by the UE, thereby simplifying RLC processing, improving processing efficiency, facilitating to resolve the RLC failure correctly and rapidly, and improving user experience.

In the methods provided by the embodiments of the present application, compared with the prior art, the second network device receives the second request message that is transmitted by the first network device and includes the RLC failure related information from the UE, and provides a premise guarantee for the subsequent network device to process the RLC failure correspondingly; a corresponding processing of the RLC failure is performed based on the received second request message such that the second network device is able to interact with the first network device, so as to obtain the RLC failure related information and further determine RLC failure processing according to the received RLC failure related information and the interaction information obtained by interacting, thereby simplifying RLC processing, improving processing efficiency, facilitating to resolve the RLC failure correctly and rapidly, and improving user experience.

Additional aspects and advantages of the application will partly be presented in the following description, and those will become apparent in the following description or be appreciated in practicing of the application.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
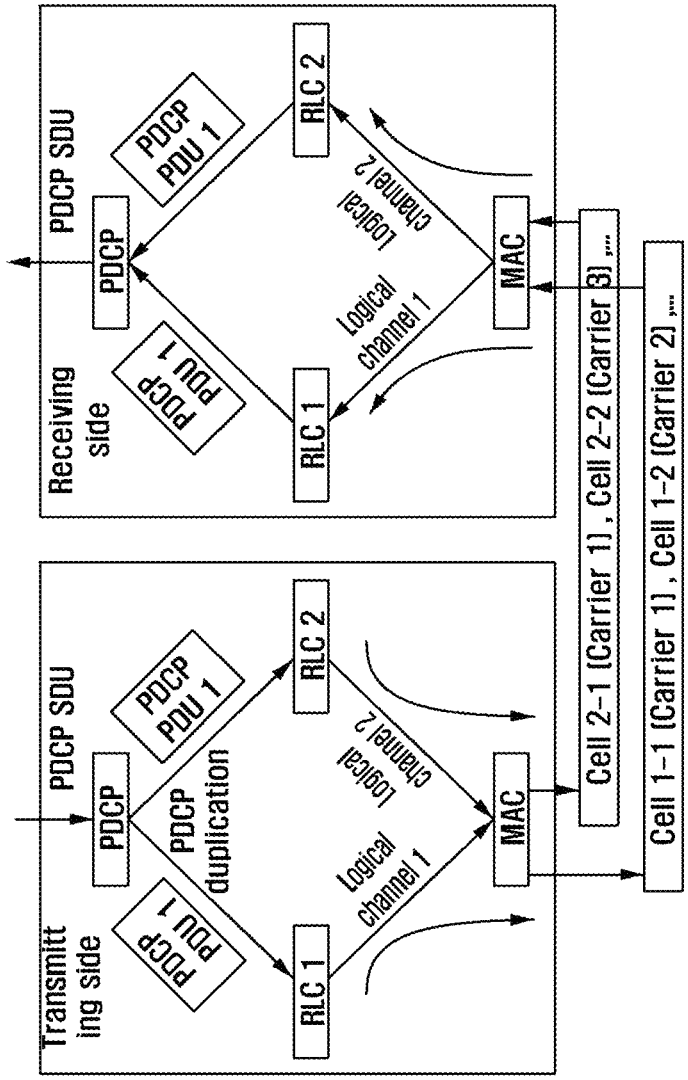
FIG. 1 illustrates a schematic diagram of an existing data transmitting process of a CA-based packet data duplication mechanism.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present invention will be described in detail hereafter. The examples of these embodiments have been illustrated in the drawings throughout which same or similar reference numerals refer to same or similar elements or elements having same or similar functions. The embodiments described hereafter with reference to the drawings are illustrative, merely used for explaining the present invention and should not be regarded as any limitations thereto.

It should be understood by those skill in the art that singular forms "a", "an", "the", and "said" may be intended to include plural forms as well, unless otherwise stated. It should be further understood that terms "include/including" used in this specification specify the presence of the stated features, integers, steps, operations, elements and/or components, but not exclusive of the presence or addition of one or more other features, integers, steps, operations, elements, components, and/or combinations thereof. It should be understood that when a component is referred to as being "connected to" or "coupled to" another component, it may be directly connected or coupled to other elements or provided with intervening elements therebetween. In addition, "connected to" or "coupled to" as used herein may include wireless connection or coupling. As used herein, term "and/or" includes all or any of one or more associated listed items or combinations thereof.

In order to make the purpose, technical solutions and advantages of the present disclosure more clearly, implementation of the present application will be further described with reference to the accompanying drawings.

Figure 2:
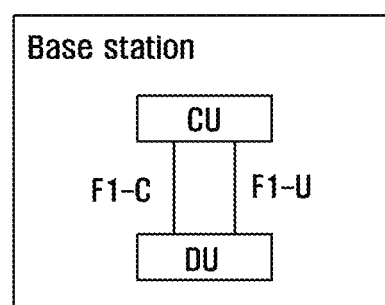
FIG. 2 illustrates a structure of an existing CU-DU split base station.

In 5G system, in order to support virtualization of network functions, a base station structure in which CU-DU being separated is defined. That is, one base station (e.g., a gNB and eNB) may be further classified into a central unit gNB-CU (gNB central unit) and a distributed unit gNB-DU (gNB distributed unit), and the central unit gNB-CU and the distributed unit gNB-DU may be simply referred to as CU and DU respectively. The CU (central unit) has a radio resource control (RRC), a Service Data Adaptation Protocol (SDAP), a Packet Data Convergence Protocol (PDCP) protocol layer, etc. The distributed unit (DU) has a Radio Link Control Protocol (RLC), a Medium Access Control (MAC), a physical layer, etc. Wherein, a standardized public interface F1 is between the CU and the DU, the F1 interface is classified into a control plane F1-C and a user plane F1-U, and FIG. 2 illustrates the structure of the CU and the DU. Therefore, in the case that CU and DU are separated, considering that the RLC failure information is transmitted through RRC signaling, the information transmitted by the UE is finally transmitted to the CU through the DU.

In addition, in the prior art, the RLC failure information is transmitted to the CU, but according to the current protocol (TS38.473), the information obtained by the CU is not enough to help the CU to obtain other information (for example, which RLC entity has failed, which SCells are associated with the RLC entity that failure occurs, etc.) related to the RLC failure, and these other information is only known by the DU. Therefore, in order to help the network side to solve the problem of the UE's RLC failure, more information is required to be exchanged between the CU and the DU.

In addition, although the network side may process the RLC failure according to the RLC failure related information reported by the UE, the processing procedure is cumbersome and inefficient, which is not conducive to correctly and quickly solving the RLC failure, and greatly reduces user experience.

The method for processing RLC failure, electronic device and computer readable storage medium provided by the present application are intended to solve the above technical problems in the prior art.

Technical solutions of the present application and how the technical solutions of the present application solve the above technical problems will be described in detail below by using specific embodiments. The following several specific embodiments may be combined with each another. Details of the same or similar concepts or processes may not be described again in some embodiments. With reference to the accompanying drawings, embodiments of the present application will now be described.

The address information (e.g., the address information of the CU side, the address information of the DU side, and the address information of the base station side) mentioned in the present application may be referred to related definitions in TS38.473 (e.g., UP Transport Layer Information) or related definitions in TS36.423 (e.g., GTP Tunnel Endpoint) or related definitions in TS38.423 (e.g., UP Transport Layer Information).

The behavior of processing an RLC failure mentioned in the present application is only illustrative, and other behaviors that may resolve RLC failures are also applicable.

Embodiment I

Figure 3:
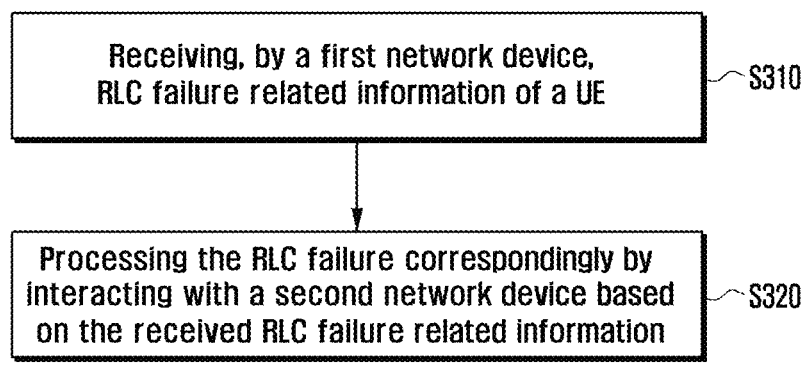
FIG. 3 illustrates a schematic flowchart of a method for processing an RLC failure according to an embodiment of the present application.

The embodiment of the present application provides a method for processing an RLC failure, which is applied to a network device, and as shown in FIG. 3, comprises:

Step S310: receiving, by a first network device, RLC failure related information of a UE.

Specifically, when cells corresponding to one logical channel of the UE are all SCells, and the RLC entity corresponding to the logical channel fails (the number of retransmissions reaches or exceeds the maximum number of retransmissions), the UE reports the RLC failure related information to the network device, that is, the first network device receives the RLC failure related information transmitted by the UE, to subsequently process RLC failure based on the RLC failure related information.

Further, the one logical channel may be a logical channel for a UE configured with the CA-based duplication mechanism.

Step S320: processing the RLC failure correspondingly by interacting with a second network device based on the received RLC related information.

Specifically, when the first network device receives the RLC failure related information transmitted by the UE, the processing of the RLC failure is determined by interacting with the second network device based on the received RLC failure related information, that is, a corresponding processing of the RLC failure is performed by interacting with the second network device based on the received RLC failure related information.

Further, the message names in this application are only illustrative, and other names may be adopted as needed.

In the method for processing an RLC failure provided by the embodiment of the present application, compared with the prior art, the first network device receives the RLC failure related information of the UE, and provides a premise guarantee for the subsequent network device to process the RLC failure correspondingly; a corresponding processing of the RLC failure is performed by interacting with the second network device based on the received RLC failure related information, such that the first network device is able to directly interact with the second network device so as to directly determine the processing of the RLC failure according to the received RLC failure related information and the interaction information reported by the UE, thereby simplifying RLC processing, improving processing efficiency, facilitating to resolve the RLC failure correctly and rapidly, and improving user experience.

Embodiment II

The embodiment of the present application provides another possible implementation. On the basis of Embodiment I, the method shown in Embodiment II is further included, wherein, the first network device is a CU, and the second network device is a DU; or the first network device is a first base station, and the second network device is a second base station.

Step S320 specifically comprises Step S3201 (not shown in FIG. 3) and step S3202 (not shown in FIG. 3), wherein, Step S3201: transmitting a first request message to the second network device;

Step S3202: receiving a first response message returned by the second network device for the first request message.

Specifically, the first request message includes at least one of the following: RLC failure related information;

indication information for indicating behavior of a network device to process the RLC failure;

information of the cell to be removed or deactivated for the RLC entity that RLC failure occurs; and reason information that the first network device transmits the first request message to the second network device.

The indication information for indicating behavior of the network device to process the RLC failure, includes indicating at least one of the following behaviors: re-establishing the RLC entity that RLC failure occurs; releasing the cell; not configuring the one or more cells as the cell corresponding to the RLC entity that RLC failure occurs; deactivating the CA-based packet data duplication mechanism; switching bandwidth part (BWP); reconfiguring data radio bearer (DRB)/signaling radio bearer (SRB) corresponding to the RLC entity that RLC failure occurs; and intra-cell handover.

Figure 4:
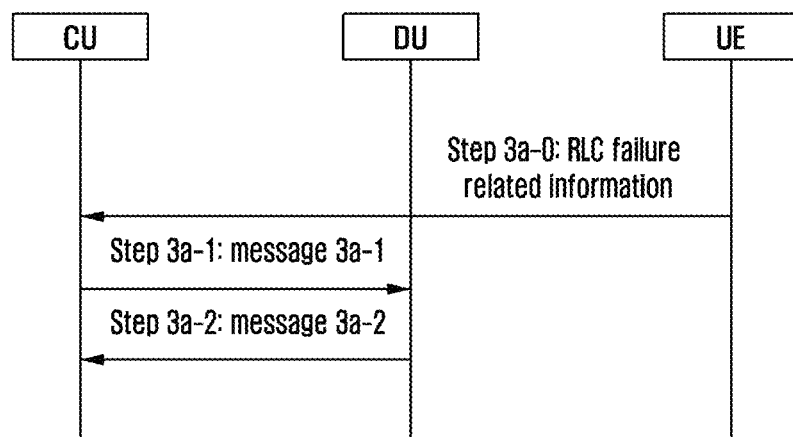
FIG. 4 illustrates a first schematic flowchart that a CU determines to process an RLC failure according to an embodiment of the present application.

Further, the embodiment of the present application is mainly for the first network device CU (hereinafter abbreviated as CU) to complete the processing of the RLC failure by interacting with the second network device DU (hereinafter referred to as DU) after receiving the RLC failure information. The specific process is shown in FIG. 4, and comprises Step 3*a*-0, Step 3*a*-1, and Step 3*a*-2 in FIG. 4. Embodiment 3a is referred below for details:

Embodiment 3a: (The CU Determines the Processing for the RLC Failure: After Receiving the RLC Failure Related Information Transmitted by the UE, the CU Performs Processing)

Step 3*a*-1: transmitting a first request message to the DU by the CU;

Specifically, in the first request message (for example, UE context modification request message), the content of the message may be referred to TS38.473, and may further include at least one of the following:

RLC failure related information, which may be at least one of the following information:
information of the logical channel corresponding to the RLC entity that RLC failure occurs (for example, logical channel identifier information), which further, the cells associated with the RLC entity are all SCells;
identifier information of one or more cells corresponding to the RLC entity that RLC failure occurs, which further, the cells associated with the RLC entity are all SCells, so the one or more cells are all SCells;
information of the DRB/SRB corresponding to the RLC entity that RLC failure occurs (for example, the identifier information), which further, the cells associated with the RLC entity are all SCells;
identifier information of the UE with the RLC failure occurring, wherein the cells associated with the RLC entity that RLC failure occurs are all SCells;
information of a cell group corresponding to the RLC entity that RLC failure occurs, for example, Master Cell Group (MCG), Secondary Cell Group (SCG), etc., which further, the cells associated with the RLC entity are all SCells;
indication information for indicating behavior of the network side (for example, DU, CU, or CU and DU) to process the RLC failure, wherein the indication information may be for at least one DRB and/or SRB, or for the UE, the indication information may be explicit or implicit, and this information may be used to indicate at least one of the following behaviors:
re-establishing the RLC entity that RLC failure occurs, which further the logical channel information corresponding to the RLC entity to be re-established may be included, for example, the logical channel identifier;
releasing a cell (e.g., an SCell), wherein, the identifier information of one or more cells to be released (NR Cell Global Identifier (CGI) of the cell, or Physical Cell Identifier (PCI) of the cell, or Index of the cell) may be further included when including the indication information indicating the behavior;

not configuring one or more cells (e.g., an SCell) as the cells corresponding to the RLC entity that RLC failure occurs, wherein the identifier information of the cell may be further included when including the indication information indicating the behaviors.

deactivating CA duplication;

switching BWP;

reconfiguring the DRB/SRB corresponding to the RLC entity that RLC failure occurs;

intra-cell handover;

information of the cell (e.g., an SCell) to be removed (or deactivated) for the RLC entity that RLC failure occurs, for example, identifier information (NR CGI, or PCI, or Index), wherein the term "removed" here indicates that the cell indicated by the information no longer serves the RLC entity; and reason information that the CU transmits the message 1-1 to the DU. For details of the reason information, may be referred to the following Embodiment IX of the present application.

Step 3a-2: receiving the first response message (e.g., UE Context Modification Response message) returned by the DU for the first request message through the CU, which the content of the message may be referred to TS38.473.

Further, before the first request message is transmitted to the DU through the CU, Step 3a-0 is further included:

receiving the RLC failure related information of the UE through the CU, wherein specifically, the RLC failure related information comprises at least one of the following:

identifier information of the UE with the RLC failure occurring;

information of the logical channel corresponding to the RLC entity that RLC failure occurs;

information of a cell group corresponding to the RLC entity that RLC failure occurs;

identifier information of one or more cells corresponding to the RLC entity that RLC failure occurs; and information of DRB/SRB corresponding to the RLC entity the RLC failure occurs.

Further, after the first request message is transmitted to the DU through the CU, the behavior of the DU side further comprises at least one of the following behaviors:

re-establishing the RLC entity corresponding to the logical channel in which the RLC failure occurs;

releasing the cell corresponding to the logical channel in which the RLC failure occurs;

removing (or deactivating) one or more or all of the cells corresponding to the logical channel in which RLC failure occurs, so that these cells no longer serve the RLC entity;

deactivating the CA duplication of the DRB/SRB corresponding to the logical channel in which the RLC failure occurs;

switching the BWP of the DRB/SRB corresponding to the logical channel in which RLC failure occurs;

reconfiguring the DRB/SRB corresponding to the RLC entity that RLC failure occurs; and intra-cell handover.

The behavior of the DU side may occur before Step 3a-2, or may occur after Step 3a-2, or may occur simultaneously with Step 3a-2.

Further, in one implementation, before Step 3a-1, the CU has already acquired some information related to the DRB/SRB which has been configured with CA duplication, for example, the information of a logical channel corresponding to one RLC entity, and uses the information and the information related to the RLC failure received from the UE to determine the processing of the RLC failure.

Embodiment III

The embodiment of the present application provides another possible implementation. On the basis of Embodiment I, the method shown in Embodiment III is further included, wherein, the first network device is a CU, and the second network device is a DU; or the first network device is a first base station, and the second network device is a second base station.

The method further comprises Step S3001 (not shown in FIG. 3) and Step S3002 (not shown in FIG. 3), wherein, Step S3001: transmitting a fifth request message to the second network device by the first network device.

Step S3002: receiving a fifth response message fed back by the second network device.

Specifically, the fifth request message comprises at least one of the following: identifier information of the UE;

indication information for indicating to configure the CA duplication for one DRB or SRB;

indication information for indicating to report the information of the logical channel corresponding to at least one path configured to support CA duplication;

indication information for indicating to report the identifier of the cell corresponding to at least one path configured to support CA duplication; and the indication information for indicating to configure CA duplication for one DRB or SRB is indicated by containing two pieces of address information of the first network devices or by containing duplication indication;

the fifth response message comprises at least one of the following:

identifier information of the UE;

configuration information of the UE generated by the second network device;

two pieces of address information of the second network devices, wherein the two pieces of address information of the second network devices is for one DRB configured with CA duplication;

logical channel information corresponding to at least one path configured to support CA duplication; and one or more cell identifiers corresponding to at least one path configured to support CA duplication.

Figure 5:
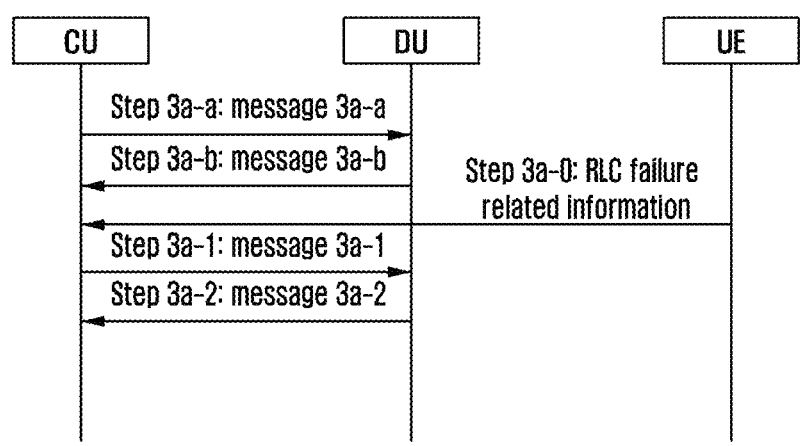
FIG. 5 illustrates a second schematic flowchart that a CU determines to process an RLC failure according to an embodiment of the present application.

Further, the embodiment of the present application is mainly for the first network device CU (hereinafter abbreviated as CU) to complete the processing of the RLC failure by interacting with the second network device DU (hereinafter referred to as DU) after receiving the RLC failure information. The specific process is shown in FIG. 5, and comprises Step 3a-a, Step 3a-b, Step 3a-0, Step 3a-1, and Step 3a-2 in FIG. 5. Embodiment 3b is referred below for details:

Embodiment 3b: (The CU Determines the
Processing for the RLC Failure: After Acquiring
CA Duplication Information, Receiving the RLC
Failure Related Information Transmitted by the UE,
and then the CU Performs the Processing)

Steps 3a-0~3a-2, may be referred to the description in Embodiment 3a.

In addition, further, optionally, before Step 3a-0, the method may further include:

Step 3a-a: transmitting a message 3a-a (for example, UE context setup/modification request message) to the DU by the CU, wherein the message contains at least one of the following information (referring to the UE context setup/modification request message of TS38.473):

identifier information of the UE, for example, gNB-DU/gNB-CU UE F1AP ID;

indication information that is used to indicate to configure the CA duplication for one DRB or SRB, which the information may be an implicit indication information or an explicit indication information, and may be one of the following forms:

indicating by containing two pieces of address information of the CU side;

indicating by containing duplication indication;

in addition to the above information, optionally, for one DRB or SRB (in one embodiment, the DRB or SRB needs or has been configured with CA duplication), at least one of the following information may be included:

indication information for indicating to report the information of the logical channel corresponding to at least one path (e.g., the primary path and/or the secondary path) configured to support CA duplication, which further, if one or more cells corresponding to the at least one path are all secondary cells (SCell), then the DU reports the indication information of the logical channel information;

indication information for indicating to report the identifier of the cell corresponding to at least one path (e.g., the primary path and/or the secondary path) configured to support CA duplication, which further, if the one or more cells corresponding to the at least one path are all secondary cells (SCell), then the DU reports the indication information of the cell identifier information;

Steps 3a-b: transmitting a message 3a-b (e.g., UE context setup/modification response message) to the CU by the DU, wherein the message includes at least one of the following information (referring to the UE context setup/modification response message of TS38.473):

identifier information of the UE, for example, gNB-DU/gNB-CU UEF1AP ID;

configuration information (e.g., TS38.473 "DU to CU RRC Information" IE) of the UE generated by the DU side;

for one DRB, if CA duplication is configured, two pieces of the address information of the DU side are contained;

in addition to the above information, optionally, for one DRB or SRB (in one embodiment, the DRB or SRB needs or has been configured with CA duplication), at least one of the following information may be included:

the logical channel information (e.g., the logical channel identifier) corresponding to at least one path (for example, the primary path and/or the secondary path) configured to support CA duplication, which further, if the cell corresponding to the logical channel corresponding to the at least one path is only the SCell, the DU only contains the logical channel information (e.g., the logical channel identifier) corresponding to the above at least one path; further, if two paths are configured to support CA duplication, the DU will contain the logical channel information (e.g., the logical channel identifiers) corresponding to the two paths; and further, only if two paths are configured to support CA duplication and the cell corresponding to the logical channels corresponding to the two paths is only the SCell, then the DU will contain the logical channel information (e.g., the logical channel identifier) corresponding to the two path.

one or more cell identifiers corresponding to at least one path (e.g., a primary path and/or a secondary path) configured to support CA duplication, which further, if the cells corresponding to the at least one path are SCell, then the DU contains identifier information of one or more SCells corresponding to the at least one path. Further, if the above two paths are configured to support CA duplication, the DU may contain identifier information of one or more cells corresponding to the two paths; further, only if two paths are configured to support CA duplication and the cells corresponding to the two paths are SCells, then the DU contains the identifier information of one or more cells corresponding to the two paths.

Further, Step 3a-a and Step 3a-b of the embodiment may be used as a process for obtaining CA duplication configuration information to perform CA duplication configuration and related information acquisition between the CU and the DU, that is, the flow of the two steps may be used separately, which are not required to include steps 3a-0~3a-2.

Embodiment IV

The embodiment of the present application provides another possible implementation. On the basis of Embodiment I, the method shown in Embodiment IV is further included, wherein, the first network device is a CU, and the second network device is a DU; or the first network device is a first base station, and the second network device is a second base station.

The method further includes Step S3101 (not shown in FIG. 3) and Step S3102 (not shown in FIG. 3), wherein, Step S3101: transmitting a message including the RLC failure related information to the second network device, by the first network device.

Step S3102: receiving information related to the RLC entity that RLC failure occurs, which is fed back by the second network device.

Specifically, the information related to the RLC entity that RLC failure occurs includes at least one of the following:

information of the logical channel corresponding to the RLC entity that RLC failure occurs;

identifier information of one or more cells corresponding to the RLC entity that RLC failure occurs; and, information of the DRB/SRB corresponding to the RLC entity that RLC failure occurs.

Figure 6:
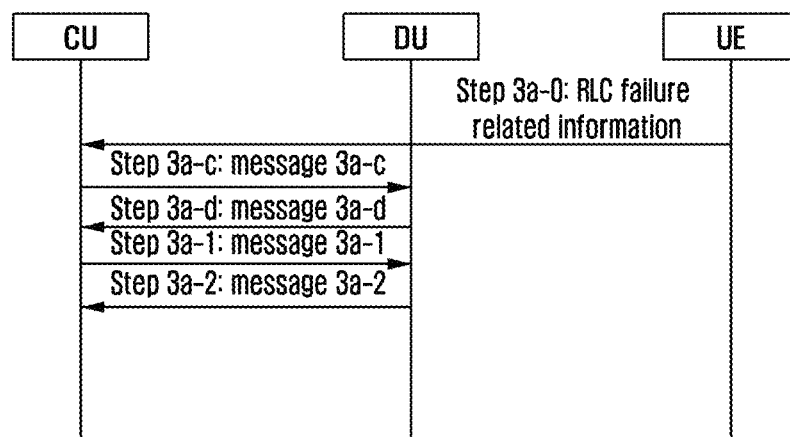
FIG. 6 illustrates a third schematic flowchart that a CU determines to process an RLC failure according to an embodiment of the present application.

Further, the embodiment of the present application is mainly for the first network device CU (hereinafter abbreviated as CU) to complete the processing of the RLC failure by interacting with the second network device DU (hereinafter referred to as DU) after receiving the RLC failure information. The specific process is shown in FIG. 6, and comprises Step 3a-0, Step 3a-c, Step 3a-d, Step 3a-1, and Step 3a-2 in FIG. 6. Embodiment 3c is referred below for details:

Embodiment 3c: (The CU Determines the Processing for the RLC Failure: After Receiving the RLC Failure Related Information Transmitted by the UE, the CU Acquires Information Related to the RLC Entity that RLC Failure Occurs, and then the CU Performs Processing)

after Step 3a-0 and before Step 3a-1 of Embodiment 3a, optionally, the method may further include:

Steps 3a-c: transmitting a message 3a-c containing the RLC failure related information to the DU by the CU, wherein the message contains at least one of the following information:
  the information (e.g., logical channel identifier information) of the logical channel corresponding to the RLC entity that RLC failure occurs, which further, the cells associated with the RLC entity are all SCells;
  the identifier information of one or more cells corresponding to the RLC entity that RLC failure occurs, which further, the cells associated with the RLC entity are all SCells, so the one or more cells are all SCells;
  the information (e.g., the identifier information) of the DRB/SRB corresponding to the RLC entity that RLC failure occurs, which further, the cells associated with the RLC entity are all SCells;
  identifier information of the UE with RLC failure occurring, for example, the gNB-DU/CU UE F1AP ID, wherein the cells associated with the RLC entity the RLC failure occurs are all SCells;
  the information of a cell group corresponding to the RLC entity that RLC failure occurs, for example, MCG, SCG, etc., which further, the cells associated with the RLC entity are all SCells;
  Steps 3a-d: feeding back Message 3a-d to the CU by the DU according to the received message 3a-c, wherein the message contains information related to the RLC entity that RLC failure occurs, and contains at least one of the following information:
  the information of the logical channel corresponding to the RLC entity that RLC failure occurs (for example, logical channel identifier information), wherein, the cells associated with the RLC entity are all SCells;
  the identifier information of one or more cells corresponding to the RLC entity that RLC failure occurs, which further, the cells associated with the RLC entity are all SCells, so the one or more cells are all SCells;
  the information (for example, the identifier information) of the DRB/SRB corresponding to the RLC entity that RLC failure occurs, wherein, the cells associated with the RLC entity are all SCells;

Further, Step 3a-c and Step 3a-d of this embodiment may be performed between the CU and the DU as a process for acquiring information related to the RLC entity that RLC failure occurs, or between the first base station and the second base station, that is, the process of these two steps may be used separately, and be not required to include steps 3a-0~3a-2.

Embodiment V

The embodiment of the present application provides another possible implementation. On the basis of Embodiment IV, the method shown in Embodiment V is further included, wherein, the first network device is a CU, and the second network device is a DU; or the first network device is a first base station, and the second network device is a second base station.

Step S330 (not shown in FIG. 3) is also included: processing RLC failure correspondingly by a predefined reason information related to radio link failure.

The predefined reason information related to radio link failure, includes at least one of the following:
  primary cell radio link failure;
  downlink radio link failure;
  uplink radio link failure;
  secondary cell radio link failure;
  downlink secondary cell radio link failure; and
  uplink secondary cell radio link failure.

Further, the embodiment of the present application mainly defines the reason information related to radio link failure, wherein the following reason information may be defined:
  primary cell radio link (RL) failure (or SCG failure or MCG failure): this reason information indicates that the maximum number of retransmissions of the ARQ of the RLC entity is exceeded, or a problem or an error in physical link; further, the reason information may also indicate that the cell related to the RLC entity may include at least a PCell or a PSCell or a SpCell (the SpCell is a generic term for the PCell and the PSCell), and the cell associated with the physical link includes at least a PCell or a PSCell or a SpCell (the SpCell is a generic term for the PCell and the PSCell);
  downlink (DL) RL failure (or referred as DL SCG failure or DL MCG failure): this reason information indicates that the maximum number of retransmissions of the ARQ of the RLC entity (e.g., the RLC entity of the base station side) is exceeded, or a problem or an error in physical downlink; further, the reason information may further indicate that the cell associated with the RLC entity includes at least a PCell or a PSCell or a SpCell (SpCell is a generic term for PCell and PSCell), and the cell associated with the physical link includes at least a PCell or a PSCell or a SpCell (SpCell is a generic term for PCell and PSCell);
  uplink (UL) RL failure: this reason information indicates that the reason that the failure occurs is that the maximum number of retransmissions of the ARQ of the RLC entity (for example, the RLC entity at the UE side) is exceeded, or a problem or an error in physical uplink; further, the reason information may further indicate that the cell associated with the RLC entity includes at least a PCell or a PSCell or a SpCell (SpCell is a generic term for the PCell and the PSCell), and the cell associated with the physical link includes at least a PCell or a PSCell or SpCell (SpCell is a generic term for PCell and PSCell);
  secondary cell (Scell) RL failure (or referred as SCell Failure): this reason information indicates that the maximum number of retransmissions of the ARQ of the RLC entity is exceeded, or a problem or an error in physical link; the cell associated with the RLC entity are all SCell, and the cell associated with the physical link are all SCells;
  DL SCell RL failure (or referred as DL SCell Failure): this reason information indicates that the maximum number of retransmissions of the ARQ of the RLC entity (e.g., the RLC entity of the base station side) is exceeded, or a problem or an error in physical downlink; the cells associated with the RLC entity are all SCells, and the cell associated with the physical links are all SCells;
  UL SCell RL failure (or referred as UL SCell Failure): this reason information indicates that the maximum number of retransmissions of the ARQ of the RLC entity (e.g., the RLC entity at the UE side) is exceeded, or a problem or an error in physical uplink; the cells associated with the RLC entity are all SCells, and the cell associated with the physical links are all SCells.

The reason information may be transmitted to the DU by the CU or transmitted to the CU by the DU. Further, the CU may select one of the foregoing reason information and transmit it to the DU. The DU may select one of the foregoing reason information and transmit it to the CU.

Further, the foregoing reason information may be for one DRB/SRB (e.g., when providing the reason information, it is necessary to indicate the information of the reason information for the DRB/SRB, for example, DRB/SRB identifier information), or may be for one cell (e.g., when providing the reason information, it is necessary to indicate the information of the cell for the reason information, for example, the cell identifier information).

Further, the foregoing reason information may be for a message transmitted by the CU to the DU, which is used to indicate the reason for the CU transmitting the message, or a message transmitted by the DU to the CU to indicate the reason for the DU transmitting the message.

Further, the foregoing reason information may be exchanged between two base stations, may be for one DRB/SRB, may be for one cell, or may be used to indicate the reason for the base station transmitting a message.

Further, the name of the above reason information is only illustrative, and may be other names.

Further, based on the foregoing reason information, after receiving a message, the CU or the DU or the base station may understand the reason for transmitting the message. Further, after receiving the foregoing reason information, the CU or the DU or the base station may determine the following behavior, for example, re-establishing the RLC entity, releasing or removing the cell, or performing intra-cell handover, or performing inter-cells handover.

Further, the above reason information is not limited to being used to process the RLC failure, and may be used in other applicable situations.

Further, the above-described reason information is applicable not only to the situation that the CU determines the processing of the RLC failure but also to the situation that the DU determines the processing of the RLC failure.

Further, the process of the above interaction of the reason information may be an independent process.

Embodiment VI: (The DU Determines to Process the RLC Failure)

Figure 7:
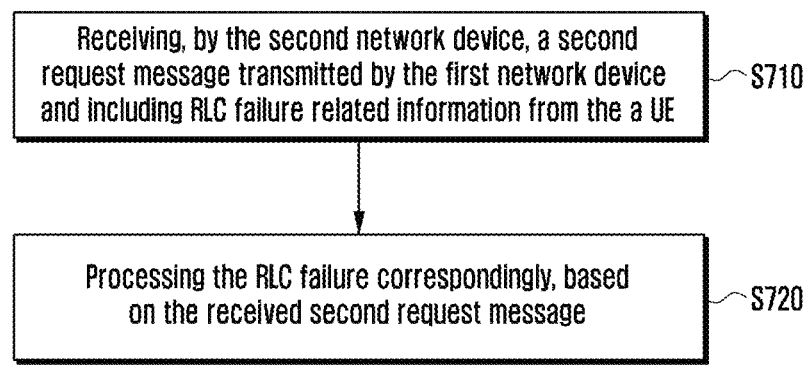
FIG. 7 illustrates a schematic flowchart of another method for processing an RLC failure according to an embodiment of the present application.

The embodiment of the present application provides a method for processing an RLC failure, which is applied to a network device, as shown in FIG. 7, and includes:

Step S710: receiving, by the second network device, a second request message transmitted by the first network device and including RLC failure related information from a UE.

Step S720: processing the RLC failure correspondingly, based on the received second request message.

In the method provided by the embodiment of the present application, compared with the prior art, the second network device receives the second request message that is transmitted by the first network device and includes the RLC failure related information from the UE, and provides a premise guarantee for the subsequent network device to process the RLC failure correspondingly; a corresponding processing of the RLC failure is performed based on the received second request message such that the second network device is able to interact with the first network device, so as to obtain the RLC failure related information and further determine the processing of the RLC failure based on the received RLC failure related information and the interaction information obtained by interacting, thereby simplifying RLC processing, improving processing efficiency, facilitating to resolve the RLC failure correctly and rapidly, and improving user experience.

Embodiment VII: (The DU Determines to Process the RLC Failure)

The embodiment of the present application provides another possible implementation. On the basis of Embodiment VI, the method shown in Embodiment VII is further included, wherein the first network device is a CU, and the second network device is a DU; or the first network device is a first base station, and the second network device is a second base station.

the second request message includes at least one of the following:
RLC failure related information;
indication information for indicating the behavior of a network device to process the RLC failure;
information of the cell to be released or to be removed;
information of the cell to be removed or deactivated for the RLC entity that RLC failure occurs;
information of DRB/SRB to be modified; and
reason information that the first network device transmits the second request message to the second network device;

The behavior of processing the RLC failure includes at least one of: re-establishing the RLC entity that RLC failure occurs; releasing the cell; not configuring the one or more cells as the cell corresponding to the RLC entity that RLC failure occurs; deactivating the CA based packet data duplication mechanism; switching the BWP; reconfiguring the DRB/SRB corresponding to the RLC entity that RLC failure occurs; and intra-cell handover.

Step S720 specifically includes step S7201 (not shown in FIG. 7): transmitting second response information to the first network device based on the received second request message.

Specifically, the second response message includes at least one of the following:
configuration information of the UE generated by the second network device;
information related to the DRB/SRB being modified;
information related to the cell being released or removed;
information related to the RLC entity that the RLC failure occurs;
the configuration information of the UE generated by the second network device includes at least one of the following: logical channel identifier information; indication information for re-establishing the RLC entity; and identifier information of the cell being released;
the information related to the DRB/SRB being modified includes at least one of the following: identifier information of the DRB/SRB being modified; information of at least one logical channel of the DRB/SRB being modified; identifier information of a cell corresponding to at least one logic channel of the DRB/SRB being modified; one piece of address information of a second network device side corresponding to the DRB being modified;
the information related to the cell being released or removed includes at least one of the following: identifier information of the cell; information related to the DRB/SRB that the cell serves; information of the logical channel corresponding to the cell;
the information related to the RLC entity that RLC failure occurs includes at least one of the following: information of a logical channel corresponding to the RLC entity that RLC failure occurs; identifier information of one or more cells corresponding to the RLC entity that RLC failure occurs; the information of the DRB/SRB corresponding to the RLC entity that RLC failure occurs.

Further, after Step S7201, Step S7202 (not shown in FIG. 7) is further included: the second network device performs at least one of the following actions: re-establishing the RLC entity corresponding to the logical channel in which the RLC failure occurs; releasing the cell corresponding to the logical channel in which RLC failure occurs; removing or deactivating at least one of the cell corresponding to the logical channel in which RLC failure occurs; deactivating the CA duplication of the DRB/SRB corresponding to the logical channel in which RLC failure occurs; switching BWP serving the DRB/SRB corresponding the logical channel in which the RLC failure occurs; reconfiguring the DRB/SRB corresponding to the RLC entity that RLC failure occurs; and, intra cell handover.

Figure 8:
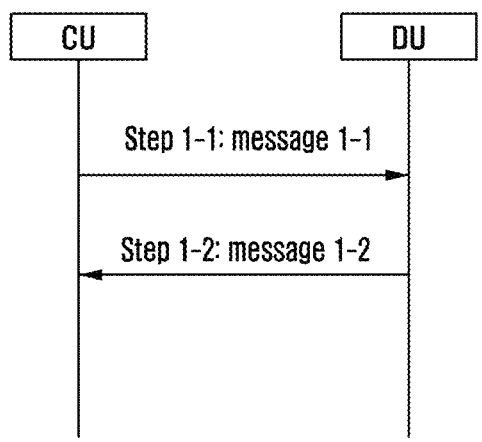
FIG. 8 illustrates a first schematic flowchart that a DU determines to process an RLC failure according to an embodiment of the present application.

Further, the embodiment of the present application is mainly for the DU to complete the processing of the RLC failure after receiving the RLC failure information, and the specific processing procedure is as shown in FIG. 8, and Step 1-1 and Step 1-2 are included in FIG. 8, wherein, Step 1-1: transmitting, by the CU, Message 1-1 (e.g., UE context modification request message) to the DU, wherein the content of the message may be referred to TS38.473, and in addition, the message may also contain at least one of the following information:

RLC failure related information, which may be at least one of the following information:

the information (e.g., logical channel identifier information) of the logical channel corresponding to the RLC entity that RLC failure occurs, which further, the cells associated with the RLC entity are all SCells;

the identifier information of one or more cells corresponding to the RLC entity that RLC failure occurs, which further, the cells associated with the RLC entity are all SCells, so the one or more cells are all SCells;

the information (e.g., the identifier information) of the DRB/SRB corresponding to the RLC entity that RLC failure occurs, which further, the cells associated with the RLC entity are all SCells;

the identifier information of the UE with RLC failure occurring, wherein the cells associated with the RLC entity that RLC failure occurs are all SCells;

the information of a cell group corresponding to the RLC entity that RLC failure occurs, for example, MCG, SCG, etc., which further, the cells associated with the RLC entity are all SCells;

the indication information for indicating the behavior of the network side (e.g., DU, CU, or CU and DU) processing the RLC failure, wherein the indication information may be for at least one DRB and/or SRB, or for the UE, the indication information may be explicit or implicit, and this information may be used to indicate at least one of the following behaviors:

re-establishing the RLC entity that RLC failure occurs, which further the logical channel information corresponding to RLC entity to be re-established may be included, for example, the logical channel identifier;

releasing a cell (e.g., an SCell), wherein, the identifier information (NR Cell Global Identifier (CGI) of the cell, or Physical Cell Identifier (PCI) of the cell, or Index of the cell) of one or more cells to be released may be included when containing the indication information indicating the behavior;

not configuring one or more cells (e.g., an SCell) as the cells corresponding to the RLC entity that RLC failure occur, wherein the identifier information of the cell may be further included when containing the indication information indicating the behaviors;

deactivating CA duplication;

switching BWP;

reconfiguring the DRB/SRB corresponding to the RLC entity that RLC failure occurs;

intra-cell handover;

the information of the cell (e.g., an SCell) to be released or removed, for example, identifier information (NR CGI, or PCI, or Index), wherein in one embodiment, the cell can only be SCell;

the information of the cell (e.g., an SCell) to be removed (or deactivated), for example, identifier information (NR CGI, or PCI, or Index), for the RLC entity that RLC failure occurs, wherein the term "removed" here indicates the cell indicated by the information no longer serves the RLC entity; and the information of the DRB/SRB to be modified, for example, the identifier information of the DRB/SRB;

the reason information that the CU transmits Message 1-1 to the DU, wherein details of the reason information may be referred to the following Embodiment IX of the present application.

Step 1-2: transmitting, by the DU, Message 1-2 (e.g., UE Context Modification Response message) to the CU, wherein the content of the message may be referred to TS38.473, and in addition, the message may also contain at least one of the following information:

the configuration information (for example, TS38.473 "DU to CU RRC Information" IE) of the UE generated by the DU side (i.e., the DU in the embodiment of the present application), wherein the information may contain at least one of the following information:

the logical channel identifier information;

the indication information for re-establishing the RLC entity;

the identifier information of the cell being released;

the information related to the DRB/SRB being modified, wherein the information indicating that the DU has completed the modification of the DRB/SRB indicated by the information, further, the DRB/SRB being modified corresponds to the RLC entity that RLC failure occurs, and the information contains at least one of the following information:

the identifier information of the DRB/SRB being modified;

the information of at least one logical channel of the DRB/SRB being modified (e.g., logical channel identifier information);

the identifier information of the cell corresponding to the at least one logical channel of the DRB/SRB being modified, wherein the cell indicated by the information no longer serves the DRB/SRB;

one piece of address information of a DU side corresponding to the DRB being modified (e.g., DL UP TNL information). In the prior art, the number of address information of the CU side of the DRB being modified provided in Message 1-1 of Step 1-1 should be the same as the number of the address information of the DU side provided in Message 1-2 of Step 1-2. However, in the present application, the number of address information of the CU side of the DRB being modified provided in Message 1-1 of Step 1-1 is allowed to be different from the number of the address of the DU side provided in Message 1-2 of Step 1-2. In an embodiment, in Message 1-1 of Step 1-1, the CU provides the DU two pieces of address information of the CU side corresponding to the DRB. According to the prior art, in Message 1-2 of Step 1-2, the DU is required to provide the CU with two pieces of address information of the DU side corresponding to the DRB. However, in this solution, the DU only provides the CU with one piece of address information of the DU side corresponding to the DRB, and after the CU receives Message 1-2, the CU may select one of the two pieces of address information of the CU sides contained in Message 1-1 as the address information of the CU side serving the DRB. In another embodiment, in Message 1-1 of Step 1-1, the CU does not provide the DU with the address information of the CU side of the DRB, but at the current moment, the CU side has already used the two addresses to serve the DRB. The DU side has already served the DRB by using two addresses. According to the prior art, the DU does not contain the address information of the DU side in Message 1-2. However, in this solution, one piece of address information of the DU side is allowed to be contained.

In the prior art, the prerequisite for containing "information related to the DRB/SRB being modified" is that "information related to the DRB/SRB to be modified" is contained in Message 1-1 of Step 1-1. Specifically, if Message 1-1 of Step 1-1 contains a "DRB to Be Modified List" IE (Information Element), the IE indicates the information of the DRB to be modified, then Message 1-2 of Step 1-2 will contain the "DRB Modified List" IE, which indicates the DRBs that have been successfully modified. These DRBs are selected from the DRB indicated by the "DRB to Be Modified List" IE in Message 1-1 of Step 1-1. However in the present embodiment, for one DRB/SRB, when allowing not containing "information related to the DRB/SRB to be modified" corresponding to DRB/SRB in Message 1-1 of Step 1-1, DU may also contain the above-mentioned "information related to the DRB/SRB being modified" corresponding to the DRB/SRB in Message 1-2 of Step 1-2, and further, if Message 1-1 of Step 1-1 contains "RLC failure related information", even "information related to the DRB/SRB to be modified" is not contained in Step 1-1 for a certain DRB/SRB, DU may also contain the above-mentioned "information related to DRB/SRB being modified" corresponding to the DRB/SRB in Message 1-2 of Step 1-2.

> the information related to a cell (e.g., an SCell) being released or removed, includes at least one of the following:
> the identifier information of the cell;
> the information related to the DRB/SRB that the cell serves, for example, identifier information;
> the information of the logical channel corresponding to the cell, for example, the logical channel identifier information, which further, the RLC entity corresponding to the logical channel fails, i.e., the logical channel is contained in "RLC failure related information" in Message 1-1 of Step 1-1.

Further, if the "RLC failure related information" is contained in Message 1-1 of Step 1-1, Message 1-2 of Step 1-2 is allowed to contain "information related to the cell (e.g., Scell) being released or removed", and these cells being released correspond to RLC entity that RLC failure occurs.

> the information related to the RLC entity that RLC failure occurs, the information including at least one of the following information:
> the information of the logical channel corresponding to the RLC entity that RLC failure occurs (e.g., logical channel identifier information), wherein, the cells associated with the RLC entity are all SCells;
> the identifier information of one or more cells corresponding to the RLC entity that RLC failure occurs, which further, the cells associated with the RLC entity are all SCells, so the one or more cells are all SCells;
> the information of the DRB/SRB corresponding to the RLC entity that RLC failure occurs (e.g., the identifier information), wherein, the cells associated with the RLC entity are all SCells;

Further, after receiving the above information related to the RLC entity that RLC failure occurs, the CU further processes the RLC failure correspondingly.

Further, if the "RLC failure related information" is contained in Message 1-1 of Step 1-1, Message 1-2 of Step 1-2 is allowed to contain "information related to the cell (e.g., Scell) being released or removed", and these cells being released correspond to RLC entity that RLC failure occurs.

Further, before Step 1-1, a step that the CU receives the RLC failure related information of the UE is further included, wherein the information may be transmitted by the UE to the CU through the DU, or may be transmitted by the CU of the other base station or the base station to the CU.

Further, the behavior of the DU side also includes at least one of the following behaviors:

> re-establishing the RLC entity corresponding to the logical channel in which the RLC failure occurs;
> releasing the cell corresponding to a logical channel in which RLC failure occurs;
> removing (or deactivating) one or more or all of the cells corresponding to the logical channel in which RLC failure occurs, so that the cells no longer serve the RLC entity;
> deactivating the CA duplication of the DRB/SRB corresponding to the logical channel in which RLC failure occurs;
> switching the BWP serving the DRB/SRB corresponding to the logical channel in which the RLC failure occurs;
> reconfiguring the DRB/SRB corresponding to the RLC entity that RLC failure occurs; and
> intra-cell handover.

The behavior of the DU side may occur before Step 1-2, or may occur after Step 1-2, or may occur simultaneously with Step 1-2.

Embodiment VIII: (The DU Determines to Process the RLC Failure)

The embodiment of the present application provides another possible implementation. On the basis of Embodiment VI, the method shown in Embodiment VIII is further included, wherein, The first network device is a CU, and the second network device is a DU; or the first network device is a first base station, and the second network device is a second base station.

Step S720 includes Step S7201 (not shown in FIG. 7) and Step S7202 (not shown in FIG. 7), wherein, Step S7201: transmitting a third request message including the RLC failure related information to the first network device.

Step S7202: receiving a third response message returned by the first network device for the third request message.

Specifically, the third request message includes at least one of the following:

> configuration information of the UE generated by the second network device;
> information related to the DRB/SRB to be modified;
> information related to the cell to be released or removed;
> indication information for indicating behavior of a network device to process the RLC failure; reason information that the second network device transmits the third request message to the first network device;

information related to the RLC entity that RLC failure occurs;

the configuration information of the UE generated by the second network device includes at least one of the following: logical channel identifier information; indication information for re-establishing the RLC entity; and identifier information of the cell being released;

The information related to the DRB/SRB to be modified includes at least one of the following: identifier information of the DRB/SRB being modified; information of at least one logical channel of the DRB/SRB being modified; identifier information of a cell corresponding to at least one logic channel of the DRB/SRB being modified; one piece of address information of a second network device side corresponding to the DRB being modified;

The information related to the cell to be released or removed includes at least one of the following: identifier information of the cell; information of the DRB/SRB that the cell serves; information of the logical channel corresponding to the cell;

The behavior of processing the RLC failure includes at least one of the following: re-establishing the RLC entity that RLC failure occurs; releasing the cell; not configuring the one or more cells as the cell corresponding to the RLC entity that RLC failure occurs; deactivating the CA duplication; switching the BWP; reconfiguring the DRB/SRB corresponding to the RLC entity that RLC failure occurs; and intra-cell handover.

The information related to the RLC entity that RLC failure occurs includes at least one of the following: information of a logical channel corresponding to the RLC entity that RLC failure occurs; identifier information of one or more cells corresponding to the RLC entity that RLC failure occurs; the information of the DRB/SRB corresponding to the RLC entity that RLC failure occurs.

Further, the RLC failure related information includes at least one of the following:

the identifier information of the UE with RLC failure occurring;

information of the logical channel corresponding to the RLC entity that RLC failure occurs;

information of a cell group corresponding to the RLC entity that RLC failure occurs;

identifier information of one or more cells corresponding to the RLC entity that RLC failure occurs; and information of the DRB/SRB corresponding to the RLC entity that RLC failure occurs.

Figure 9:
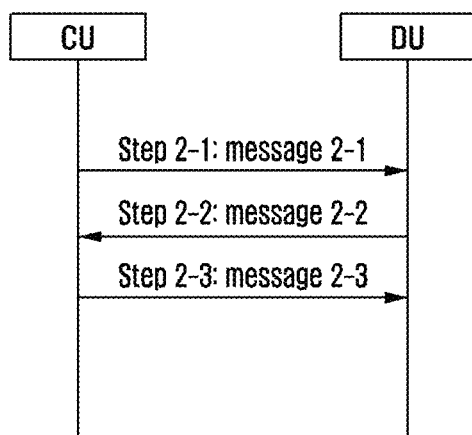
FIG. 9 illustrates a second schematic flowchart that a DU determines to process an RLC failure according to an embodiment of the present application.

Further, the information related to the RLC entity that RLC failure occurs includes at least one of the following: the information of the logical channel corresponding to the RLC entity that RLC failure occurs, further, the cells associated with the RLC entity are all SCells; the identifier information of one or more cells corresponding to the RLC entity that RLC failure occurs, further, the cells associated with the RLC entity are all SCells, the information of the DRB/SRB corresponding to the RLC entity that RLC failure occurs, further, the cells associated with the RLC entity are all SCells;

Further, the embodiment of the present application is mainly for processing the RLC failure by the DU after receiving the RLC failure information, as shown in FIG. 9, including Step 2-1, Step 2-2, and Step 2-3 in FIG. 9, wherein, Step 2-1: transmitting Message 2-1 by the CU to the DU (e.g., the message is a Class 2 message that does not require DU feedback), the message contains the RLC failure related information, and includes at least one of the following information:

the information (e.g., logical channel identifier information) of the logical channel corresponding to the RLC entity that RLC failure occurs, which further, the cells associated with the RLC entity are all SCells;

the identifier information of one or more cells corresponding to the RLC entity that RLC failure occurs, which further, the cells associated with the RLC entity are all SCells, so the one or more cells are SCells;

the information (e.g., the identifier information) of the DRB/SRB corresponding to the RLC entity that RLC failure occurs, which further, the cells associated with the RLC entity are all SCells;

Step 2-2: transmitting Message 2-2 (e.g., UE context modification required message) by the DU to the CU, wherein the content of the message may be referred to TS38.473, and the message may also contain at least one of the following information:

the configuration information (e.g., TS38.473 "DU to CU RRC Information" IE) of the UE generated by the DU side, wherein the information may contain at least one of the following information:

the logical channel identifier information;

the indication information for re-establishing the RLC entity;

the identifier information of the cell being released;

the information related to the DRB/SRB to be modified, wherein the information indicating that the DU has completed the modification of the DRB/SRB indicated by the information, further, the DRB/SRB being modified corresponds to the RLC entity that RLC failure occurs, and the information contains at least one of the following information:

the identifier information of the DRB/SRB to be modified;

the information of at least one logical channel of the DRB/SRB to be modified (e.g., logical channel identifier information);

the identifier information of the cell corresponding to the at least one logical channel of the DRB/SRB to be modified, wherein the cell indicated by the information no longer serves the DRB/SRB;

one piece of address information of the DU side corresponding to the DRB to be modified (e.g., downlink user plane transmission network layer information (DL UP TNL information), referred to TS38.473). One embodiment is that, at the current moment, the CU side has already used the two addresses to serve the DRB. The DU side has already served the DRB by using two addresses. According to the prior art, the DU does not contain one piece of address information of the DU side in Message 2-2. However, in this solution, one piece of address information of the DU side is allowed to be contained;

the information related to a cell (e.g., SCell) to be released or to be removed, wherein the information includes at least one of the following:

the identifier information of the cell;

the information related to the DRB/SRB that the cell serves, for example, identifier information;

the information of the logical channel corresponding to the cell, for example, the logical channel identifier information, which further, the RLC entity corresponding to the logical channel has failed, i.e., the logical channel is contained in "RLC failure related information" of Message 2-1 of Step 2-1;

the indication information for indicating the behavior of the network side (e.g., DU, CU, or CU and DU) to process the RLC failure, wherein the indication information may be for at least one DRB and/or SRB, or for the UE, the indication information may be explicit or implicit, and this information may be used to indicate at least one of the following behaviors:

re-establishing the RLC entity that RLC failure occurs, which further the logical channel identifier of the re-established RLC entity may be included;

releasing a cell (e.g., an SCell), wherein, the identifier information (NR CGI of the cell, or PCI, or Index) of one or more cells to be released may be included when including the indication information indicating the behavior;

not configuring one or more cells (e.g., an SCell) as the cells corresponding to the RLC entity that RLC failure occur, wherein the identifier information of the cell may be further included when including the indication information indicating the behaviors;

deactivating CA duplication;

switching BWP;

reconfiguring the DRB/SRB corresponding to the RLC entity that RLC failure occurs;

intra-cell handover;

the reason information for transmitting Message 2-2, wherein the reason information may be referred to Embodiment VI of the present application;

the information related to the RLC entity that RLC failure occurs, wherein the information includes at least one of the following information:

the information (e.g., logical channel identifier information) of the logical channel corresponding to the RLC entity that RLC failure occurs, wherein, the cells associated with the RLC entity are all SCells;

the identifier information of one or more cells corresponding to the RLC entity that RLC failure occurs, wherein, the cells associated with the RLC entity are all SCells, so the one or more cells are all SCells;

the information (e.g., the identifier information) of the DRB/SRB corresponding to the RLC entity that RLC failure occurs, wherein, the cells associated with the RLC entity are all SCells;

Further, after receiving the above information related to the RLC entity that RLC failure occurs, the CU further processes the RLC failure correspondingly.

Step 2-3: transmitting, by the CU, Message 2-3 (e.g., UE context modification confirming message) to the DU, wherein the content of the message may be referred to TS38.473.

Further, before Step 2-1, a step that the CU receives the RLC failure related information of the UE is further included, wherein the information may be transmitted by the UE to the CU through the DU, or may be transmitted by the CU of the other base station or the base station to the CU.

In addition, the present application also includes a process in which one CU transmits the RLC failure related information to the DU, which may be an independent process. In the process, the RLC failure related information includes at least one of the following information:

the information of the logical channel corresponding to the RLC entity that RLC failure occurs (e.g., logical channel identifier information), which further, the cells associated with the RLC entity are all SCells;

the identifier information of one or more cells corresponding to the RLC entity that RLC failure occurs, which further, the cells associated with the RLC entity are all SCells, so the one or more cells are all SCells;

the information of the DRB/SRB corresponding to the RLC entity that RLC failure occurs (e.g., the identifier information), which further, the cells associated with the RLC entity are all SCells;

the identifier information of the UE with RLC failure occurring, which further, the cells associated with the RLC entity that RLC failure occurs are all SCells;

the information of a cell group corresponding to the RLC entity that RLC failure occurs, for example, MCG and SCG, which further, the cells associated with the RLC entity are all SCells;

Wherein, the RLC failure related information may be transmitted by the CU to the DU through a second type (Class 2) signaling (the signaling does not have a corresponding feedback message from the DU), or may be a first type (Class 1) signaling (the signaling has a corresponding feedback message from the DU) transmitted by the CU to the DU. The definitions of the first type signaling and the second type signaling described above may be referred to TS38.413 and TS36.413.

Further, in an embodiment, after receiving the foregoing information, the DU may perform processing on the DRB/SRB in which RLC failure occurs.

Further, in another embodiment, after receiving the foregoing information, the DU may help the DU to learn about the processing performed by the CU on the DRB/SRB in which RLC failure occurs.

Embodiment IX

The embodiment of the present application provides another possible implementation. The method of Embodiment IX is further included on the basis of Embodiment VI to Embodiment VIII, wherein, the method further includes Step S730 (not shown in FIG. 7): processing the RLC failure correspondingly by a predefined reason information related to radio link failure.

Specifically, the predefined reason information related to radio link failure includes at least one of the following:

primary cell radio link failure;

downlink radio link failure;

uplink radio link failure;

secondary cell radio link failure;

downlink secondary cell radio link failure; and uplink secondary cell radio link failure.

Further, the embodiment of the present application mainly defines the reason information related to radio link failure, wherein the following reason information may be defined:

primary cell RL failure (or MCG failure): this reason information indicates that the maximum number of retransmissions of the ARQ of the RLC entity is exceeded, or a problem or an error in physical link; further, the reason information may indicate that the cell related to the RLC entity may include at least a PCell or a PSCell or a SpCell (the SpCell is a generic term for the PCell and the PSCell), and the cell associated with the physical link includes at least a PCell or a PSCell or a SpCell (the SpCell is a generic term for the PCell and the PSCell);

DL RL failure (or referred as DL SCG failure or DL MCG failure): this reason information indicates that the maximum number of retransmissions of the ARQ of the RLC entity (e.g., the RLC entity at the base station side) is exceeded, or a problem or an error in physical downlink; further, the reason information may further indicate that the cell associated with the RLC entity includes at least a PCell or a PSCell or a SpCell (SpCell is a generic term for PCell and PSCell), and the cell associated with the physical link includes at least a PCell or a PSCell or a SpCell (SpCell is a generic term for PCell and PSCell);

UL RL failure: this reason information indicates that the maximum number of retransmissions of the ARQ of the RLC entity (e.g., the RLC entity of the UE side) is exceeded, or a problem or an error in physical uplink; further, the reason information may further indicate that the cell associated with the RLC entity includes at least a PCell or a PSCell or a SpCell (SpCell is a generic term for the PCell and the PSCell), and the cell associated with the physical link includes at least a PCell or a PSCell or SpCell (SpCell is a generic term for PCell and PSCell);

SCell RL failure (or referred as SCell Failure): this reason information indicates that the maximum number of retransmissions of the ARQ of the RLC entity is exceeded, or a problem or an error in physical link; the cell associated with the RLC entity are all SCell, and the cells associated with the physical link are all SCell;

DL SCell RL failure (or referred as DL SCell Failure): this reason information indicates that the maximum number of retransmissions of the ARQ of the RLC entity (e.g., the RLC entity of the base station side) is exceeded, or a problem or an error in physical downlink; the cells associated with the RLC entity are all SCells, and the cells associated with the physical link are all SCell;

UL SCell RL failure (or referred as UL SCell Failure): this reason information indicates that the maximum number of retransmissions of the ARQ of the RLC entity (e.g., the RLC entity of the UE side) is exceeded, or a problem or an error in physical uplink; the cells associated with the RLC entity are all SCells, and the cells associated with the physical link are all SCell.

The reason information may be transmitted to the DU by the CU or transmitted to the CU by the DU. Further, the CU may select one of the foregoing reason information and transmit it to the DU. The DU may select one of the foregoing reason information and transmit it to the CU.

Further, the foregoing reason information may be for one DRB/SRB (e.g., when providing the reason information, it is necessary to indicate the information of the reason information for the DRB/SRB, for example, DRB/SRB identifier information), or may be for one cell (when providing the reason information, it is necessary to indicate the information of the reason information for the cell, for example, cell identifier information).

Further, the reason information may be for a message transmitted by the CU to the DU, which is used to indicate the reason for the CU transmitting the message, or a message transmitted by the DU to the CU to indicate the reason for the DU transmitting the message.

Further, the foregoing reason information may be exchanged between two base stations, may be for one DRB/SRB, may be for one cell, or may be used to indicate the reason for the base station transmitting a message.

Further, the name of the above reason information is only illustrative, and may be other names.

Further, based on the foregoing reason information, after receiving a message, the CU or the DU or the base station may understand the reason for transmitting the message. Further, after receiving the foregoing reason information, the CU or the DU or the base station may determine the following behavior, for example, re-establishing the RLC entity, releasing or removing the cell, or performing Pcell/PSCell handover.

Further, the above reason information is not limited to being used to process the RLC failure, and may be used in other applicable situations.

Embodiment X

The embodiment of the present application provides another possible implementation. The method of Embodiment X is further included on the basis of Embodiment VI to Embodiment IX, wherein, the method further includes Step S740 (not shown in FIG. 7) and Step S750 (not shown in FIG. 7), wherein, Step S740: receiving a fourth request message transmitted by the first network device.

Step S750: returning a fourth response message for the fourth request message to the first network device.

wherein, the number of address information of one DRB in the fourth request message is different from the number of address information of the DRB in the fourth response message.

The fourth request message includes at least one of the following:

the information of the DRB to be configured with duplication; and two piece of address information for the first network device serving the DRB.

The fourth response message includes at least one of the following:

the information of DRB configured with the duplication; and, one piece of address information for the second network device serving the DRB.

Further, the second network device serves the one piece of address information of the DRB, so that the first network device selects one from two piece of address information serving the DRB as the one piece of address information for the second network device to serve the DRB according to a predefined rule; or, the second network device serves the one piece of address information of the DRB, so that the first network device selects the corresponding address information from two pieces of address information serving the DRB, as the one piece of address information for the second network device to serve the DRB.

Figure 10:
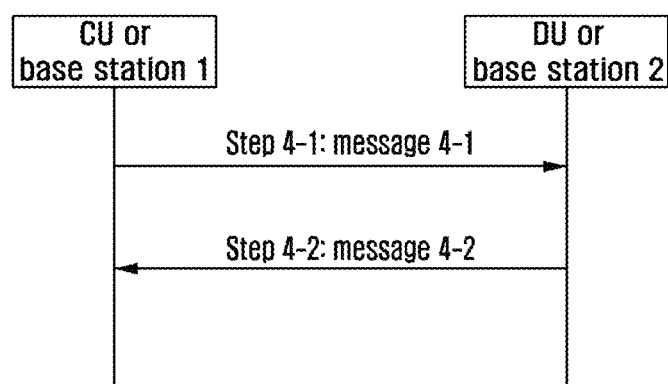
FIG. 10 illustrates a third schematic flowchart that a DU determines to process an RLC failure according to an embodiment of the present application.

Further, the embodiment of the present application mainly provides a process of configuring duplication, as shown in FIG. 10, including Step 4-1 and Step 4-2, wherein, Step 4-1: transmitting, by the CU, Message 4-1 (for example, UE context setup/modification request message) to the DU, or transmitting, by the base station 1, Message 4-1 (e.g., SgNB Addition/Modification request message) to the base station 2, which the information is used to configure duplication as referred to TS38.473, TS36.423 and TS38.423, and may contain at least one of the following information:

the information of the DRB to be configured with duplication, for example, DRB identifier information.

the address information (e.g., the GTP tunnel endpoint identifier (GTP-TEID) and the transport layer address) for the transmitting side (e.g., the CU, the base station 1) serving the DRB, which may contain two pieces of address information.

Step 4-2: transmitting, by the DU, Message 4-2 (e.g., UE setup/modification request message) to the CU, or transmitting, by the base station 2, Message 4-2 (e.g., a SgNB Addition/Modification request message) to the base station 1, which may be referred to TS38.473, TS36.423 and TS38.423, and may include at least one of the following information:

the information of the DRB configured with duplication, for example, DRB identifier information.

the address information (e.g., the GTP-TEID and the transport layer address) for the transmitting side (e.g., the DU, the base station 2) serving the DRB, which may contain two pieces of address information. In another embodiment, only one piece of address information may be contained. In this case, after receiving the message, the CU or the base station 1 may select one piece of address information from the two pieces of address information contained in the in Message 4-1 of Step 4-1 as the address information serving the DRB, and the selected one pieces of address information may be selected according to a default principle, or may be specified in Message 4-2.

The above process is not limited to the processing of the RLC failure, and for other applicable cases, the above process may also be used to configure the duplication.

Further, the problems to be solved in the present application include the following four aspects:

1. interacting related information between the CU and the DU to help the network side to process the RLC failure;

2. defining new reason information to help the network side understand the reason of the RLC failure;

3. configuring CA duplication to help the network side resolve the RLC failure; and 4. interacting the RLC failure related information between the base stations to help the network side obtain the RLC failure information.

Figure 11:
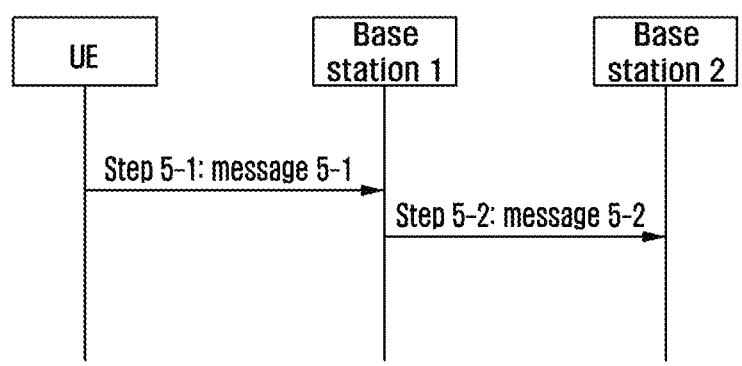
FIG. 11 illustrates a schematic diagram of a process of interaction of RLC failure related information between base stations according to an embodiment of the present application.

The contents of the first to third aspects have been described in detail in above Embodiment I to Embodiment X, and the contents of the fourth aspect are described in detail below:

FIG. 11 illustrates the basic process for interacting the RLC failure related information between the base stations. In FIG. 11, Step 5-1 and Step 5-2 are included, wherein, Step 5-1: receiving, by the base station 1 (i.e., the first network device in the embodiment of the present application), the RLC failure related information (Message 5-1) transmitted by the UE, wherein Message 5-1 is directly transmitted by the UE to the base station 1 or transmitted through the DU of the base station 1 to the DU of the base station 1, and Message 5-1 includes at least one of the following information:

the identifier information of the UE with RLC failure occurring;

the information of the logical channel corresponding to the RLC entity that RLC failure occurs (e.g., logical channel identifier information);

the information of a cell group corresponding to the RLC entity that RLC failure occurs, for example, MCG, SCG, etc.;

the identifier information of one or more cells corresponding to the RLC entity that RLC failure occurs, which further, the one or more cells are all SCells; and the information (e.g., the identifier information) of the DRB/SRB corresponding to the RLC entity that RLC failure occurs.

Step 5-2: transmitting, by the base station 1, the received Message 5-1 or part of the contents in Message 5-1 to the base station 2 (i.e., the second network device in the embodiment of the present application) through Message 5-2, which Message 5-2 may be transmitted via the X2 interface or via the Xn interface.

After receiving Message 5-2, the base station 2 processes the UE that RLC failure occurs, for example, re-establishing the UE RLC entity, releasing the cell, and the like.

Further, for "interacting related information between the CU and the DU to help the network side to process the RLC failure" of the first aspect, the corresponding overview in the embodiment of the present application is: when the first network device is a CU and the second network device is a DU, processing the RLC failure correspondingly by interacting with the second network device, based on the received RLC failure related information. That is, in the embodiment of the present application, the related information between the CU and the DU is interacted through the interaction between the CU and the DU, thereby helping to process the RLC failure. The following describes the case where the RLC failure is processed by the interaction between the CU and the DU through Embodiment III to Embodiment V.

Embodiment XI

An embodiment of the present application provides a network device, including: a processor; and a memory configured to store machine readable instructions that, when executed by the processor, cause the processor to perform the foregoing methods for processing an RLC failure.

Figure 12:
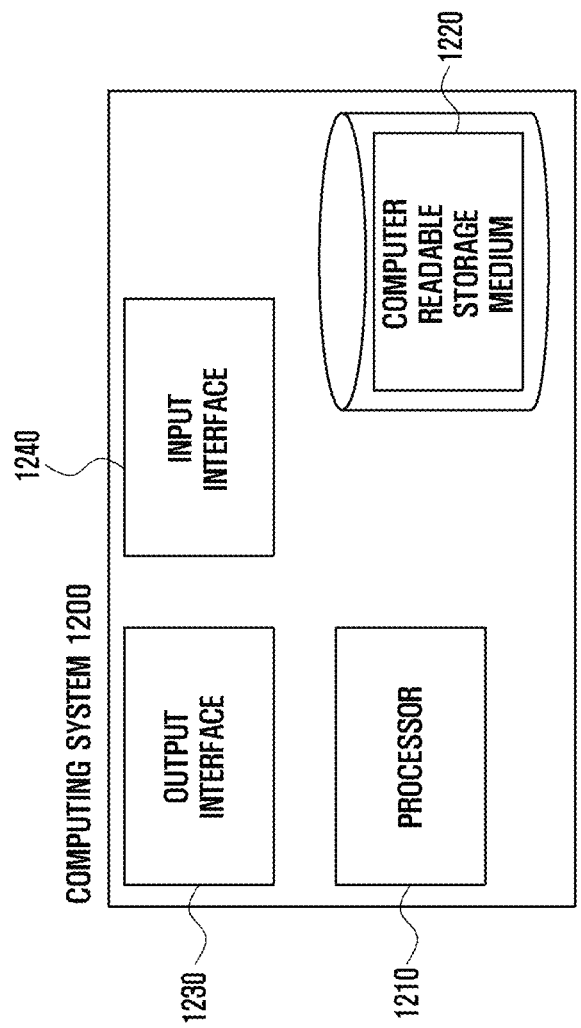
FIG. 12 illustrates a block diagram of a computing system that may be used to implement the methods for performing an RLC failure disclosed in the embodiments of the present application.

FIG. 12 schematically illustrates a block diagram that a computing system may be used to perform the methods for processing an RLC failure disclosed herein, according to the embodiment of the disclosure.

As shown in FIG. 12, the computing system 1200 includes a processor 1210, a computer readable storage medium 1220, an output interface 1230, and an input interface 1240. The computing system 1200 may perform the methods described above with reference to FIG. 3 and FIG. 7 to process an RLC failure.

In particular, the processor 1210 may include, for example, a general-purpose microprocessor, an instruction set processor, and/or a related chipset and/or a special purpose microprocessor (e.g., an application specific integrated circuit (ASIC)), and the like. The processor 1210 may also include an onboard memory for caching purposes. The processor 1210 may be a single processing unit or a plurality of processing units for performing different actions of the method flows described with reference FIG. 3 and FIG. 7.

The computer readable storage medium 1220, for example, may be any medium capable of containing, storing, communicating, propagating or transporting the instructions. For example, the computer readable medium may include, for example, but not limited to, a magnetic, optical, electromagnetic, infrared or semiconductor system, device, apparatus, or propagation medium. Specific examples of the readable storage medium include: a magnetic storage device, for example, a magnetic tape or a hard disk (HDD); an optical storage device, for example, a compact disk (CD-ROM); a memory, for example, a random-access memory (RAM) or a flash memory; and/or a wired/wireless communication link.

The computer readable storage medium 1220 may include a computer program, which may include codes/computer executable indications that, when executed by the processor 1210, causing the processor 1210 to perform, for example, the method flows described above with reference to FIG. 3 and FIG. 7, and any of variations.

The computer program may be configured as, for example, computer program codes comprising a computer program module. For example, in an example embodiment, the codes in a computer program may include one or more program modules, including, for example, module 1, module 2 and the like. It should be noted that the division scheme and number of modules are not fixed, and those skilled in the art may use suitable program modules or program module combinations according to actual conditions. When these program module combinations are executed by the processor 1210, the processor 1210 may perform the method flows, for example, described above with reference to FIG. 3, and any variations thereof.

According to the embodiment of the present disclosure, the processor 1210 may use output interface 1230 and input interface 1240 to perform the method flows described above with reference to FIG. 3 and any variations thereof.

The embodiment of the present application provides a computer readable storage medium, wherein the computer readable storage medium stores a computer program, and when the program is executed by the processor, the method shown in Embodiment I is implemented. Compared with the prior art, the first network device receives the RLC failure related information of the UE, and provides a premise guarantee for the subsequent network device to process the RLC failure correspondingly; a corresponding processing of the RLC failure is performed by interacting with the second network device based on the received RLC failure related information such that the first network device is able to directly interact with the second network device, so as to directly determine the processing of the RLC failure according to the received RLC failure related information and the interaction information reported by the UE, thereby simplifying RLC processing, improving processing efficiency, facilitating to resolve the RLC failure correctly and rapidly, and improving user experience.

The computer readable storage medium provided by the embodiment of the present application is applicable to any of the foregoing methods. Therefore, details will not be repeated here again.

It should be understood that although the various steps in the flowchart of the drawings are presented sequentially as indicated by the arrows, these steps will not be successively performed necessarily in the order indicated by the arrows. Unless explicitly stated herein, the execution of these steps will not be strictly limited, but may be performed in any order. Moreover, at least some of the steps in the flowchart of the drawings may include a plurality of sub-steps or stages, which are not necessarily performed at the same time, but may be executed in different time, and the execution order thereof will also not be necessarily performed successively, but may be performed alternatively or alternately with at least a part of other steps or sub-steps or stages of other steps.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a central unit (CU) of a base station for processing a radio link control (RLC) failure, the method comprising:
receiving, from a user equipment (UE), first information on an RLC failure;
transmitting, to a distributed unit (DU) of the base station, a UE context modification request message including the first information on the RLC failure; and
receiving, from the DU, a UE context modification response message including second information on one or more cells related to the RLC failure,
wherein the first information includes a logical channel identifier (LCID), and
wherein the logical channel identifier is related to an RLC entity needing re-establishment.

2. The method according to claim 1, wherein the second information includes a list of secondary cells related to the RLC entity included in the first information.

3. A method performed by a distributed unit (DU) of a base station for processing a radio link control (RLC) failure, the method comprising:
receiving, from a central unit (CU) of the base station, a UE context modification request message including first information on an RLC failure; and
transmitting, to the CU, a UE context modification response message including second information on one or more cells related to the RLC failure,
wherein the first information on the RLC failure is received by the CU from a user equipment (UE), and
wherein the first information includes a logical channel identifier (LCID), and
wherein the logical channel identifier is related to an RLC entity needing re-establishment.

4. The method according to claim 3, wherein the second information includes a list of secondary cells related to the RLC entity included in the first information.

5. A central unit (CU) of a base station, the CU comprising:
a transceiver; and
a controller coupled with the transceiver and configured to:
receive, from a user equipment (UE), first information on a radio link control (RLC) failure,
transmit, to a distributed unit (DU) of the base station, a UE context modification request message including the first information on the RLC failure, and
receive, from the DU, a UE context modification response message including second information on one or more cells related to the RLC failure,
wherein the first information includes a logical channel identifier (LCID), and
wherein the logical channel identifier is related to an RLC entity needing re-establishment.

6. The CU according to claim 5, wherein the second information includes a list of secondary cells related to the RLC entity included in the first information.

7. A distributed unit (DU) of a base station, the DU comprising:
a transceiver; and
a controller coupled with the transceiver and configured to:
receive, from a central unit (CU) of the base station, a UE context modification request message including first information on a radio link control (RLC) failure, and
transmit, to the CU, a UE context modification response message including second information on one or more cells related to the RLC failure,
wherein the first information on the RLC failure is received by the central unit from a user equipment (UE), and wherein the first information includes a logical channel identifier (LCID), and wherein the logical channel identifier is related to an RLC entity needing re-establishment.

8. The DU according to claim 7, wherein the second information includes a list of secondary cells related to the RLC entity included in the first information.

* * * * *